(12) United States Patent
Magdon-Ismail et al.

(10) Patent No.: US 9,753,833 B2
(45) Date of Patent: *Sep. 5, 2017

(54) WORKLOAD SELECTION AND CACHE CAPACITY PLANNING FOR A VIRTUAL STORAGE AREA NETWORK

(71) Applicant: VMware, Inc., Palo Alto, CA (US)

(72) Inventors: Tariq Magdon-Ismail, San Jose, CA (US); Duy Nguyen, Fremont, CA (US); Brian James Martin, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/555,072

(22) Filed: Nov. 26, 2014

(65) Prior Publication Data

US 2016/0147631 A1    May 26, 2016

(51) Int. Cl.
*G06F 11/34*    (2006.01)
*H04L 29/08*    (2006.01)

(52) U.S. Cl.
CPC ...... *G06F 11/3485* (2013.01); *G06F 11/3442* (2013.01); *G06F 11/3461* (2013.01); *H04L 67/1097* (2013.01); *H04L 67/2842* (2013.01); *G06F 11/3471* (2013.01); *G06F 2201/815* (2013.01); *G06F 2201/83* (2013.01); *G06F 2201/885* (2013.01)

(58) Field of Classification Search
CPC ............ G06F 11/3485; G06F 11/3461; G06F 11/3442; G06F 11/3471; G06F 2201/815; G06F 2201/885; G06F 2201/83; H04L 67/2842; H04L 67/1097
See application file for complete search history.

(56) References Cited

U.S. PATENT DOCUMENTS 5,452,440 A * 9/1995 Salsburg ............ G06F 11/3447
711/133
5,940,618 A * 8/1999 Blandy ............... G06F 11/3461
714/E11.198

(Continued)

OTHER PUBLICATIONS

What's New in VMware Virtual SAN, Technical White Paper V1.0, Feb. 2014 Update, Item No. VMW-TWP-VSAN-GA-edn-USLET-102, VMWare, Copyright 2014, 18 pages.

(Continued)

*Primary Examiner* — Benjamin Wu

(57) ABSTRACT

Exemplary methods, apparatuses, and systems receive a first input/output (I/O) trace including storage addresses that were subject to a plurality of I/O requests from a first workload during a first period of time. The first I/O trace is run through a cache simulation using a plurality of simulated cache sizes. A first state of the cache simulation is stored upon completing the first I/O trace simulation. The first I/O trace is deleted in response to storing the first state. A second I/O trace including storage addresses that were subject to a plurality of I/O requests from the first workload during a second period of time is received. A cumulative miss ratio curve for the first workload is generated by loading the stored first state as a starting point for simulating the second I/O trace and running the second I/O trace through the cache simulation.

17 Claims, 9 Drawing Sheets

(56) References Cited

U.S. PATENT DOCUMENTS

| | | | |
|---|---|---|---|
| 6,493,810 B1* | 12/2002 | Pang | H04L 67/2852 711/130 |
| 6,952,664 B1* | 10/2005 | Lahiri | G06F 17/5022 703/13 |
| 7,103,517 B2* | 9/2006 | Gluhovsky | G06F 17/5022 703/2 |
| 7,120,567 B2* | 10/2006 | Gluhovsky | G06F 11/3457 703/2 |
| 7,139,872 B1* | 11/2006 | Bachmat | G06F 11/3447 711/113 |
| 7,363,450 B1* | 4/2008 | Fedorova | G06F 9/4881 711/118 |
| 7,756,968 B1 | 7/2010 | Frey | |
| 8,010,337 B2* | 8/2011 | Narayanan | G06F 11/3419 703/22 |
| 8,527,704 B2* | 9/2013 | Bivens | G06F 11/3409 703/2 |
| 9,229,877 B2* | 1/2016 | Bivens | G06F 11/3409 |
| 9,336,141 B2* | 5/2016 | Waldspurger | G06F 12/0802 |
| 2004/0006452 A1* | 1/2004 | Gluhovsky | G06F 12/0802 703/2 |
| 2004/0059561 A1* | 3/2004 | Gluhovsky | G06F 17/5009 703/22 |
| 2005/0071596 A1 | 3/2005 | Aschoff et al. | |
| 2006/0107025 A1* | 5/2006 | Cypher | G06F 12/0864 711/216 |
| 2006/0136370 A1 | 6/2006 | Buckler et al. | |
| 2007/0239936 A1* | 10/2007 | Gluhovsky | G06F 12/0802 711/118 |
| 2008/0271038 A1 | 10/2008 | Rolia et al. | |
| 2010/0107142 A1* | 4/2010 | Chilimbi | G06F 11/3447 717/128 |
| 2011/0138124 A1* | 6/2011 | Hill | G06F 11/3471 711/122 |
| 2012/0117299 A1* | 5/2012 | Waldspurger | G06F 12/122 711/6 |
| 2014/0310462 A1 | 10/2014 | Waldspurger et al. | |
| 2015/0058487 A1* | 2/2015 | Karamanolis | G06F 12/0802 709/226 |
| 2015/0363236 A1* | 12/2015 | Manpathak | G06F 9/5016 711/160 |
| 2016/0140052 A1* | 5/2016 | Waldspurger | G06F 12/121 711/129 |

OTHER PUBLICATIONS

VMware Virtual SAN, Radically Simple Hypervisor-Converged Storage, Datasheet, Item No. VMW5140-DS-VIRTUAL-SAN-A4-112, VMWare, Copyright 2014, 2 pages.

Gulati, et al., StorageWorkload Characterization and Consolidation in Virtualized Environments, VMware Inc., International Workshop on Virtualization Performance: Analysis, Characterization, and Tools (VPACT), Apr. 2009, 10 pages.

VMware Virtual SAN Design and Sizing Guide, Technical Marketing Documentation, V1.0, Mar. 2014, Item No. VMW-TMD-VSAN-Dsgn-Szng-Guide-USLET-101, VMWare, Copyright 2014, 12 pages.

Non-Final Office Action for U.S. Appl. No. 14/555,091, mailed May 19, 2016, 16 pages.

Non-Final Office Action for U.S. Appl. No. 14/555,114, mailed May 20, 2016, 19 pages.

Notice of Allowance for U.S. Appl. No. 14/555,114, mailed Jul. 6, 2016, 15 pages.

* cited by examiner

| Hit Count | 0 | 0 | 0 | 1 | 0 | 0 | 0 | 0 | ••• |
|---|---|---|---|---|---|---|---|---|---|
| Reuse Distance | 0 | 1 | 2 | 3 | 4 | 5 | 6 | 7 | ••• |
↖ 500
FIG. 5
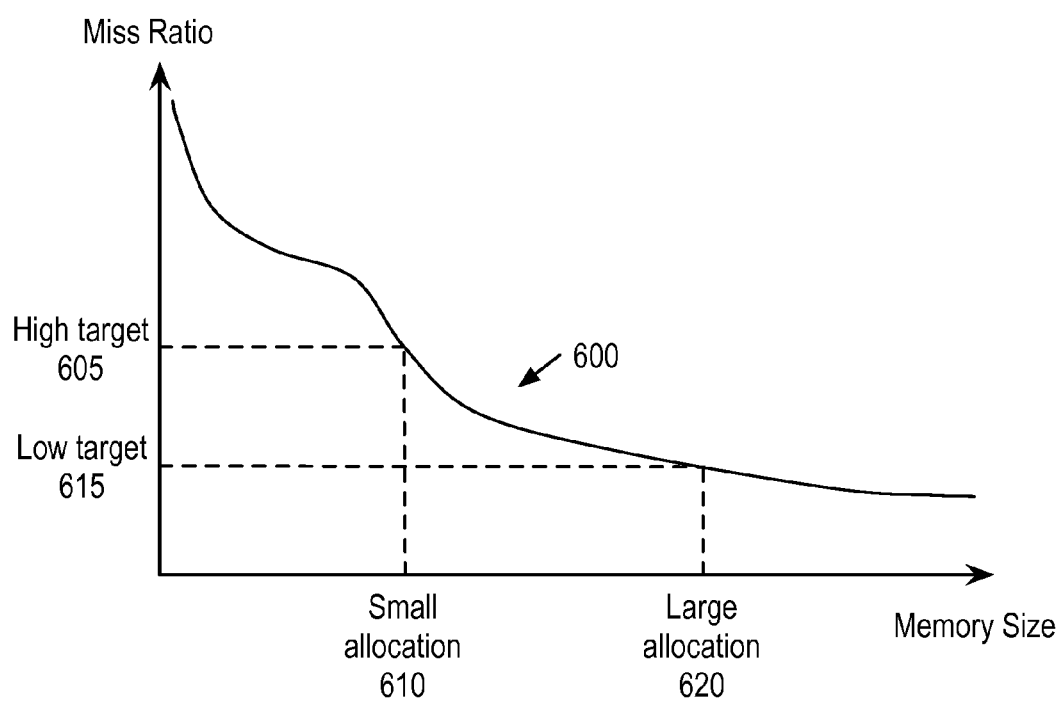
FIG. 6
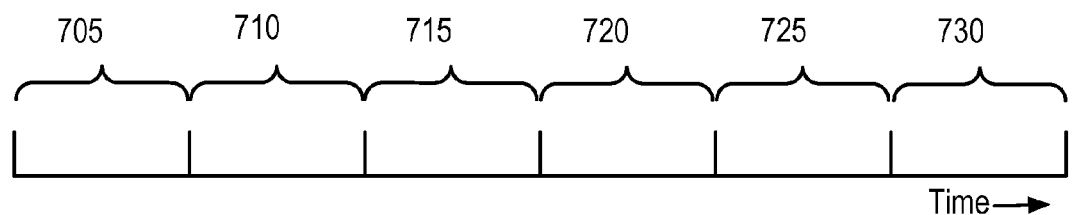
FIG. 7

WORKLOAD SELECTION AND CACHE CAPACITY PLANNING FOR A VIRTUAL STORAGE AREA NETWORK

FIELD OF THE INVENTION

The various embodiments described herein relate to configuring a virtual storage area network. In particular, embodiments relate to selecting workloads to run within a virtual storage area network and analyzing selected workloads to determine an amount of memory to allocate to the virtual storage area network.

BACKGROUND OF THE INVENTION

A virtual storage area network (VSAN) aggregates storage directly attached to servers (e.g., host computers) to create a distributed, shared storage system for a number of workloads (e.g., virtual machines) running on the servers. For example, each server may utilize an attached solid state drive as a cache and one or more hard disk drives as underlying storage. The cache may improve input/output (I/O) performance for some workloads e.g., as compared to operating outside of a VSAN. The I/O performance of other workloads, however, may not benefit from the cache. As a result, it is worthwhile to be selective in which workloads are run within a VSAN and/or the caching policies for the selected workloads. Additionally, the amount by which I/O performance is improved is dependent upon the amount of memory allocated for caching each workload. Collecting and analyzing I/O requests for a large number of workloads to determine an amount of memory to allocate, however, is costly in terms of time, storage, and processing resources.

BRIEF DESCRIPTION OF THE DRAWINGS

The present invention is illustrated by way of example and is not limited to the figures of the accompanying drawings, in which like references indicate similar elements, and in which:

FIG. 5 is an exemplary data structure used to track hit counts and data reuse distances;

FIG. 6 is a chart of an exemplary miss ratio curve calculated using tracked data reuse patterns;

FIG. 7 is a representation of periods of time in which incremental traces may be taken from one or more workloads;

DETAILED DESCRIPTION

Figure 1:
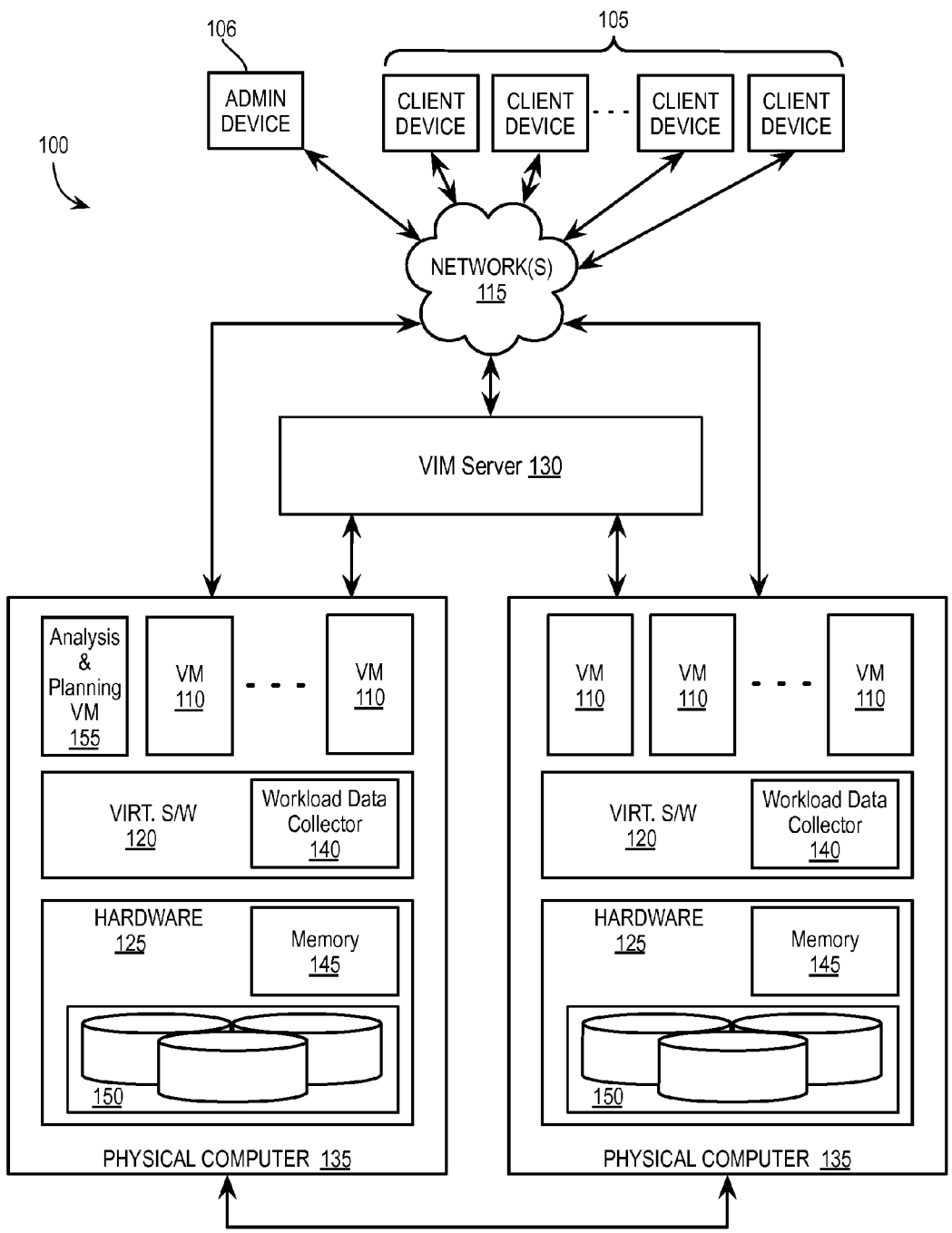
FIG. 1 illustrates, in block diagram form, an exemplary virtual datacenter environment including one or more networked processing devices to implement workload selection and cache capacity planning for a virtual storage area network.

Embodiments described herein receive input/output (I/O) characteristics and, based upon the characteristics, determine which workloads that are suitable for operation within a virtual storage area network (VSAN). As a result, an administrator is presented with workloads that may experience an improvement in performance when run within a VSAN. Additionally, embodiments may be selective in which workloads are analyzed for determining VSAN cache allocation. It is more efficient to analyze only those workloads that are selected/suitable for operation within the VSAN, especially when hundreds of workloads running within a virtual datacenter may be considered for VSAN suitability.

In analyzing workloads to determine VSAN cache allocation, embodiments collect I/O trace data for workloads over a period of time, e.g., an I/O trace representing seven days of workload I/O requests. To minimize the amount of memory required to store this amount of I/O trace data, embodiments simulate cache performance using increments of the I/O traces as the I/O trace data is collected. Upon simulation of each increment of the I/O trace, a simulation state is stored as a checkpoint and the corresponding increment of the I/O trace is deleted.

Additionally, embodiments may be limited by the number of concurrent I/O traces a host computer is able to generate. For example, a host computer may run 100 workloads while only being able to concurrently generate 19 workload traces. Accordingly, partial I/O traces (e.g., each representing a separate, continuous period of time of a workload) are taken at random intervals from varying subsets of workloads. For example, incremental I/O traces for a given workload may have intervening periods of time that are not subject to an I/O trace. Embodiments determine a miss ratio curve (MRC) of each incremental I/O trace and determine cache sizes corresponding to a target miss rate using the determined MRCs. Simply summing the cache sizes for each incremental I/O trace may overestimate the cache size needed for the corresponding workload. Instead, some embodiments determine if the incremental I/O traces represent different or common phases of operation of a workload. A maximum value is selected from the cache sizes that correspond to incremental I/O traces from a common phase. A sum or other combination of cache sizes is selected for incremental I/O traces from different phases.

Furthermore, while some workloads may run for longer periods of time or continuously, other workloads may power on and only run for a relatively short period of time before powering off. Long I/O trace sample periods may provide a more accurate representation of data reuse distances. With the number of concurrent I/O traces a host computer can generate being less than the number of workloads running at a given time, however, short I/O trace sample periods increase the likelihood a host computer will capture I/O trace data even for those workloads that have a short run time. Accordingly, embodiments determine whether to generate a long I/O trace or a short I/O trace for a given workload based upon runtime history for the workload, I/O trace history for the workload, and/or workload type of the first workload.

Embodiments set forth herein are described with reference to VSAN suitability and cache allocation. Other embodiments, however, may be directed to a different host computer configuration or virtual datacenter configuration in which workloads are similarly evaluated for suitability to work with a non-VSAN caching architecture and the workloads are similarly analyzed to determine a corresponding cache allocation.

FIG. 1 illustrates, in block diagram form, an exemplary virtual datacenter environment 100 including one or more networked processing devices to implement workload selection and cache capacity planning for a virtual storage area network. While embodiments are described herein with reference to server-based computing in a virtual datacenter environment, the embodiments of tracking data reuse patterns and allocating memory may be implemented in other computing environments that manage one or more workloads.

The illustrated server-based computing allows client devices 105 to access centrally managed user virtual desktops, such as those implemented by VMs 110, via network(s) 115 (e.g., a local area network or other private or publically accessible wide area network, such as the Internet). For example, client device 105 and VM 110 may use a desktop remoting protocol such as Remote Desktop Protocol (RDP), Virtual Network Computing (VNC), or Personal Computer over Internet Protocol (PCoIP) to remotely access/provide remote access to a virtual desktop generated by VM 110. Additionally, one or more VMs 110 may implement another virtualized compute, networking, storage, or security service (e.g., a firewall, webserver, database server, etc.).

Remote access to virtual desktops is generally provided to client devices 105 through virtual infrastructure management (VIM) server 130. In one embodiment, the VIM server 130 provides virtual desktop access to the client devices 105. Additionally, or alternatively, VIM server 130 orchestrates the provisioning of software defined datacenter services implemented by one or more VMs 110. VIM server 130 may be a physical computer system or a virtual machine that runs infrastructure management software to, e.g., provide a remotely accessible user interface to administrator device 106 to manage the configuration of VMs 110, virtualization software 120, and hardware 125.

VMs 110 are complete computation environments, containing virtual equivalents of the hardware and system software components of a physical system and are typically implemented by an extensive virtualization infrastructure, which includes a variety of software and hardware components. A virtualization software layer 120 (e.g., a hypervisor) running on hardware 125 of host computer 135 manages one or more VMs 110. Virtualization software layer 120 manages physical resources, e.g., hardware 125, as well as maintains virtual-to-physical hardware mappings. For example, virtualization software layer 120 maps each VM 110 to a portion of memory 145 and storage 150 allocated to the VM 110. Memory 145 may be flash memory or another high-speed memory used to implement a cache between VMs 110 and storage 150. As a result, data for a given VM 110 may be quickly fetched from the host computer's memory 145 rather than by accessing underlying storage 150, which may be a disk drive or other non-volatile data stores directly attached to a host computer 135.

In one embodiment, memory 145 and storage 150 may be configured to be a part of a VSAN. The VSAN aggregates storage 150 of multiple host computers 135 to create a distributed, shared storage system for a number of workloads (e.g., VMs 110) running on the corresponding host computers 135. For example, each host computer 135 may utilize an attached solid state drive 145 as a cache and one or more hard disk drives 150 as underlying storage.

Analysis and planning VM 155 runs within one or more host computers 135 and works cooperatively with workload data collector 140 within virtualization software 120 of each host computer 135 to determine VMs 110 suitable for implementation of a VSAN and perform a cache analysis and allocation recommendation for suitable VMs 110. While analysis and planning VM 155 is illustrated and described as a virtual machine running on a host computer 135, analysis and planning VM 155 may alternatively be implemented in a non-virtual environment (e.g., as software running on a physical computer rather than as a virtual machine).

In one embodiment, workload data collector 140 is a command-line interface (CLI), application programming interface (API), or other interface that enables analysis and planning VM 155 running on the same or on another host computer 135 to initiate the collection of I/O characteristics and I/O trace data. Workload data collector 140 gathers and/or computes statistics on I/O requests from each workload and transmits the I/O characteristics and trace data to analysis and planning VM 155, e.g., directly, via network(s) 115, or via VIM server 130. In one embodiment, workload data collector 140 includes a number of loggers that are capable of collecting I/O characteristics and trace data in parallel. For example, workload data collector 140 may include 19 loggers that concurrently collect I/O characteristics and trace data from 19 workloads. The collection and analysis of I/O characteristics and trace data and corresponding cache allocation planning is described further with reference to FIGS. 2-11.

Figure 2:
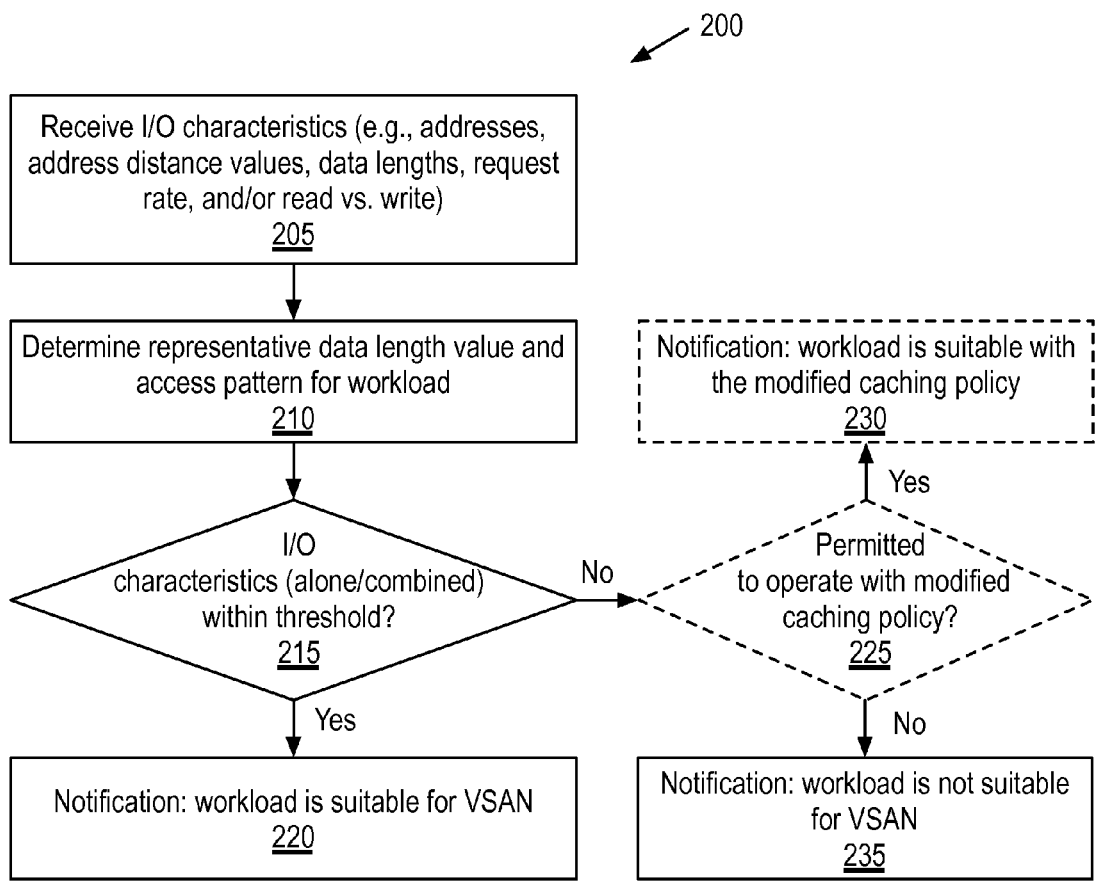
FIG. 2 is a flow chart illustrating an exemplary method of selecting workloads that are suitable for a virtual storage area network.

FIG. 2 is a flow chart illustrating exemplary method 200 of selecting workloads that are suitable for a VSAN. At block 205, analysis and planning VM 155 receives I/O characteristics of one or more workloads. For example, workload data collector 140 creates a copy of data characterizing I/O requests from VMs 110. Exemplary I/O characteristics of an I/O request include one or more of: a logical address, a length of data subject to the I/O request, a logical address distance between the current I/O request and a previous or subsequent I/O request, a time between I/O requests (e.g., a rate at which I/O requests are received), whether the request is a read or a write, I/O latency (e.g., the time between receipt and completion of a request), an identifier of the workload, etc. In one embodiment, workload collector 140 gathers I/O characteristics using a utility within virtualization software 120, such as vscsiStats that is a part of the VMware® hypervisor architecture. Workload data collector 140 passes the I/O characteristics to analysis and planning VM 155.

At block 210, analysis and planning VM 155 determines a representative length value and access pattern for each workload. For example, a representative length value may represent a maximum, average, mean, median, or other common value for representing a set of I/O request data lengths. In one embodiment, the representative length is included within and selected from the received I/O characteristics. Alternatively, the representative length is calculated by analysis and planning VM 155 from a set of I/O request lengths within the received I/O characteristics.

Similar to the representative length, an access pattern is included within the received I/O characteristics or determined by analysis and planning VM 155 from the received I/O characteristics. The access pattern falls within a spectrum from random access to sequential access based upon the distance between consecutive I/O requests. In one embodiment, the access pattern is determined using the distance between logical addresses of consecutive I/O requests and corresponding lengths of data subject to the I/O requests (e.g., the logical address distance between the end of one request and the beginning of the next request). An I/O request for data at an address that immediately follows the end of a previous I/O request (e.g., the first logical address following the logical address of the previous I/O request plus the corresponding data length) is representative of a sequential access. Non-zero distances between I/O requests are indicative of a random access pattern. In one embodiment, the access pattern for a given workload is based upon the number of sequential I/O requests as compared to the number non-sequential I/O requests. A greater the number of sequential I/O requests results in access pattern that is close to the sequential end of the spectrum and a greater number of non-sequential I/O requests results in an access pattern that is close to the random end of the spectrum.

At block 215, analysis and planning VM 155 determines whether the received I/O characteristics are within a threshold of VSAN suitability. For example, analysis and planning VM 155 may compare the representative data length value to a length threshold and/or the access pattern to an access pattern threshold. As the representative data length value increases and/or the access pattern becomes more sequential, the suitability of the workload may decrease. In one embodiment, analysis and planning VM 155 compares a combination of the representative data length value and access pattern to a combined threshold. For example, analysis and planning VM 155 calculates a suitability score based upon a combination of the characteristics and wherein determines if the calculated suitability score is less than a combined suitability threshold value. In one embodiment, the access pattern is assigned a numerical value that can be added to, multiplied by, or otherwise combined with the data length value to generate the calculated suitability score.

In one embodiment, one threshold value is dependent upon the value of another characteristic. For example, the length threshold may increase as the access pattern becomes more random.

In one embodiment, the access pattern is compared against multiple thresholds. For example, analysis and planning VM 155 may determine that the workload is suitable for VSAN when the access pattern falls between first and second thresholds on the spectrum from random access to sequential access.

Other characteristics may also be used, alone or in combination with the representative data length value and access pattern. Exemplary other characteristics include the rate of I/O requests, the bandwidth of I/O requests, whether the I/O requests are reads or writes, I/O latency, etc. For example, as the rate of I/O requests increases, the suitability of a workload may decrease. Additionally, as the bandwidth of the I/O requests (e.g., the rate of I/O requests multiplied by the representative data length) increases, the suitability of the workload may decrease. In yet another embodiment, analysis and planning VM 155 further determines suitability based upon whether the I/O requests are read or write commands. For example, a workload including long data length values for sequential/random reads may be suitable for VSAN while a workload including long data length values for sequential/random writes may not. As a result, a data length threshold may be applied to writes, but not to reads.

If the received I/O characteristics are within a threshold of VSAN suitability, at block 220, analysis and planning VM 155 generates a notification that the corresponding workload is suitable for VSAN. In one embodiment, generating the notification includes transmitting a notification to administrator device 106 including a list of workloads suitable for VSAN. In one embodiment, generating the notification includes notifying workload data collector(s) 140 to collect I/O trace data from workloads determined to be suitable for VSAN (e.g., as described further with reference to FIGS. 4-10).

If the received I/O characteristics are not within a threshold of VSAN suitability, at block 225, analysis and planning VM 155 optionally determines if the workload is permitted to operate with a modified caching policy that would make the workload suitable for VSAN. For example, the workload may be eligible for the use of a different cache replacement algorithm or bypassing the cache altogether. In one embodiment, one or more thresholds (e.g., the data length threshold or the access pattern threshold) are dependent upon a caching policy or algorithm. As a result of modifying the caching policy or algorithm, the one or more thresholds are also modified. Analysis and planning VM 155 may reevaluate whether or not the received I/O characteristics are within the modified threshold(s) of VSAN suitability.

If the workload is permitted to operate with a modified caching policy that would make the workload suitable for VSAN, at block 230, analysis and planning VM 155 generates a notification that the corresponding workload is suitable for VSAN with the modified caching policy. If the workload is not permitted to operate with a modified caching policy (or if a modified caching policy is not considered), at block 235, analysis and planning VM 155 generates a notification that the corresponding workload is not suitable for VSAN.

Figure 3:
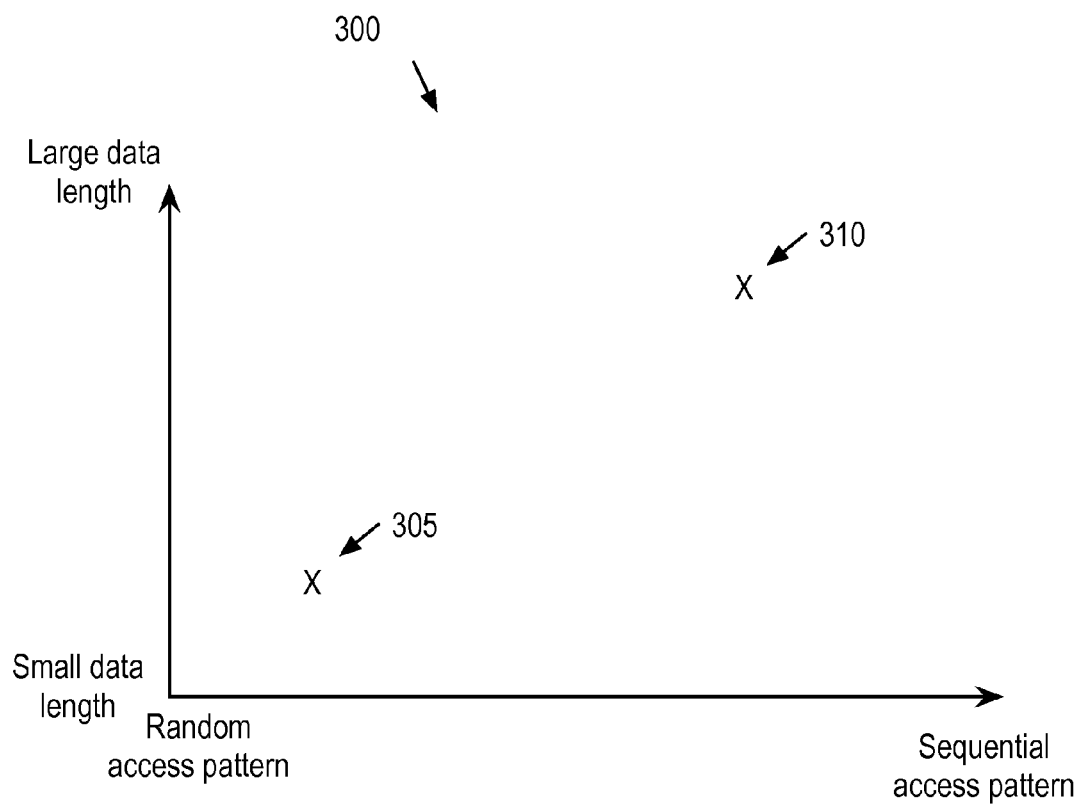
FIG. 3 is an exemplary characterization of workloads considered for virtual storage area network suitability.

FIG. 3 is an exemplary characterization of workloads considered for VSAN suitability. I/O characteristics of two workloads are plotted on graph 300. Graph 300 maps each workload's access pattern along the x-axis and each workload's representative data length along the y-axis. Plot point 305 represents a workload having a relatively random access pattern of mostly small data length requests. Plot point 310 represents a workload having a relatively sequential access pattern of mostly large data length requests. Following the examples described with reference to FIG. 2, the workload associated with plot point 305 may be determined to be suitable for VSAN while the workload associated with plot point 310 may be determined to be unsuitable for VSAN. As described above, additional I/O characteristics may be considered in determining VSAN suitability.

Figure 4:
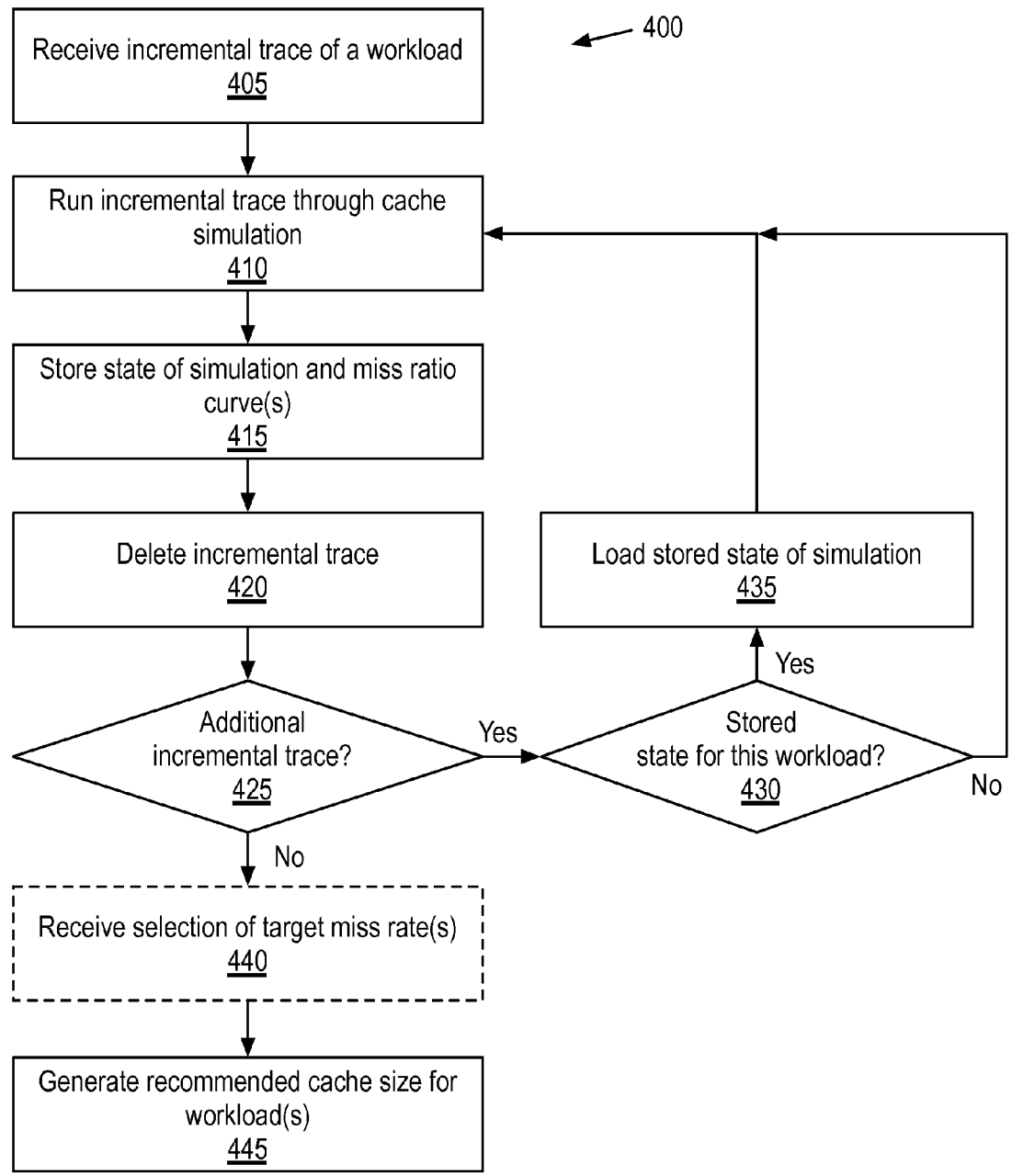
FIG. 4 is a flow chart illustrating an exemplary method of generating a recommended cache size for one or more workloads.

FIG. 4 is a flow chart illustrating exemplary method 400 of generating a recommended cache size for one or more workloads. At block 405, analysis and planning VM 155 receives an incremental I/O trace of a workload. For example, as described above, workload data collector 140 creates a copy I/O request data from VMs 110. In one embodiment, workload collector 140 initiates the I/O trace using a utility within virtualization software 120, such as vscsiStats that is a part of the VMware® hypervisor architecture. In one embodiment, each incremental I/O trace is a portion of a cumulative I/O trace made up of a number of sequential incremental I/O traces. For example, a seven-day I/O trace may be broken up into approximately 1,000 ten-minute increments. Workload data collector 140 passes each incremental I/O trace to analysis and planning VM 155 as each incremental I/O trace is obtained. Incremental and cumulative I/O traces are described further with reference to FIG. 7.

In one embodiment, analysis and planning VM 155 receives multiple incremental I/O traces from a single workload that were observed during the same period of time. For example, a workload may be associated with multiple virtual disks. I/O requests from the workload directed to one virtual disk may result in a first incremental I/O trace while I/O requests from the workload directed to another virtual disk may result in a second incremental I/O trace. In such an embodiment, analysis and planning VM 155 modifies the logical storage addresses of one or more of the incremental I/O traces to avoid collision between virtual disk addresses. For example, analysis and planning VM 155 may increment the logical storage addresses of a second incremental I/O trace by a first predetermined amount, the logical storage addresses of a third incremental I/O trace by a second predetermined amount, and so on. Once analysis and planning VM 155 has modified the logical storage addresses, analysis and planning VM 155 merges the incremental I/O traces from the workload that were observed during the same period of time into a single incremental I/O trace.

At block 410, analysis and planning VM 155 runs the incremental I/O trace through a cache simulation. For example, analysis and planning VM 155 may simulate a caching algorithm for VSAN to determine the MRC for the incremental I/O trace based upon the logical address reuse distance and a plurality of possible cache sizes. The tracking of reuse distances and determination of the resulting MRC are described with reference to FIGS. 5-6.

At block 415, analysis and planning VM 155 stores the state of the simulation to create a checkpoint for the cumulative simulation of the cumulative I/O trace. For example, analysis and planning VM 155 stores the current hit count of various reuse distances based upon the current incremental trace. In one embodiment, analysis and planning VM 155 stores the MRC for the incremental I/O trace and/or for the cumulative I/O trace.

At block 420, once the checkpoint has been created by storing the state of the simulation, analysis and planning VM 155 deletes the current incremental I/O trace to free the corresponding storage space for additional incremental I/O trace data from the same or a different workload. The stored checkpoint data consumes less storage space than the corresponding incremental I/O trace. As a result, the analysis of the cumulative I/O traces from, e.g., hundreds of workloads over multiday periods, does not create a burden on storage resources.

At block 425, analysis and planning VM 155 determines if there is another incremental I/O trace to analyze. Additional incremental I/O traces may be received from the same workload or from one or more other workloads. In one embodiment, analysis and planning VM 155 analyzes incremental I/O traces from multiple workloads in parallel. In another embodiment, analysis and planning VM 155 incremental I/O traces from multiple workloads sequentially and interleaved with one another (e.g., analysis of an incremental I/O trace from a first workload may be followed by the analysis of incremental I/O trace(s) from one or more other workloads before analyzing another incremental I/O trace from the first workload).

If there is an additional incremental I/O trace, at block 430, analysis and planning VM 155 determines if a state for this workload has previously been saved as a checkpoint. If so, at block 435, analysis and planning VM 155 loads the stored state of the simulation to continue analysis of the cumulative I/O trace for the corresponding workload. Once the checkpoint data has been loaded, or if a state for this workload has not previously been saved as a checkpoint, method 400 returns to block 410 to simulate the current incremental I/O trace.

In one embodiment, analysis and planning VM 155 simulates each incremental I/O trace alone (e.g., independent of previous incremental I/O traces) as well as a continuation of any previous incremental I/O traces from the same workload. As a result, analysis and planning VM 155 determines an MRC for a workload based upon independent incremental I/O traces as well as a cumulative I/O trace. Alternatively, analysis and planning VM 155 determines an MRC for a workload using the stored checkpoint data and utilizes that MRC determined at the next checkpoint as a representation of the corresponding incremental I/O trace.

If there are no additional incremental I/O traces to be analyzed, at block 440, analysis and planning VM 155 optionally receives selection of a target miss rate for each workload. For example, an administrator may select a target miss rate for one or more workloads for analysis and planning VM 155 to use in selecting recommended cache allocations for workload(s). Alternatively, a default target miss rate may be utilized by analysis and planning VM 155.

At block 445, analysis and planning VM 155 generates a recommended cache size for the one or more workloads based upon the target miss rate(s) and corresponding MRC(s). In one embodiment, the recommended cache size is based upon a simple summation of cache allocation of each workload determined using the MRC of the cumulative I/O trace for the corresponding workload and the workload's target miss rate. In another embodiment, the recommended cache size is based upon maximum amounts of cache that would be used be each workload during an incremental period of time. For example, analysis and planning VM 155 may determine potential cache allocations based upon the target miss rate and MRC for each incremental I/O trace for each workload and select the largest potential cache allocation for each workload and sum or otherwise combine them. In yet another embodiment, the recommended cache size is based upon a maximum amount of cache that would be used by a combination of workloads during a single incremental period of time. For example, analysis and planning VM 155 may determine potential cache allocations based upon the target miss rate and MRC for each incremental I/O trace for each workload, sum or otherwise combine the allocations of the various workloads within each incremental period of time (e.g., the sum of the allocation for a first workload within an incremental period of time and the allocation for a second workload within the same incremental period of time), and select the maximum of the sums/combined allocations. The determination of the recommended cache size is described further with reference to FIGS. 8-9.

As a result, an administrator is presented with a recommendation as to how much cache to allocate, e.g., for the configuration of a VSAN with the analyzed workloads.

FIG. 5 is an exemplary data structure 500 used to track hit counts and data reuse distances. For example, data structure 500 may initially begin with hit counts for each reuse distance set to zero. As analysis and planning VM 155 processes requests within an I/O trace, hit counts are incremented. For example, analysis and planning VM 155 stores I/O trace data for each subsequent I/O request in one or more data structures. Each time the same portion of storage is requested (e.g., via logical storage address and data length), analysis and planning VM 155 utilizes the data structure(s)

to determine the distance between the current and previous requests and increments the corresponding reuse distance hit count. For example, reuse distance 3 has been incremented from 0 to 1. In one embodiment, analysis and planning VM 155 determines reuse distance based upon Mattson's Stack algorithm or a similar algorithm.

FIG. 6 is a chart of exemplary MRC 600 calculated using tracked data reuse patterns. As illustrated, a steep decline in miss rate occurs as allocated memory increases from zero. The decline in miss rate then varies as memory allocation increases toward full allocation. In one embodiment, the MRC is determined using the hit counts for various reuse distances, e.g., as described with reference to FIG. 5. For example, if the reuse distances correspond to blocks of memory, the miss-ratio for a memory having been allocated m blocks and having a maximum possible allocation of n blocks may be calculated using the following equation:

$$1-(\Sigma_{i=0}^{m}\text{Hit}[i]/\Sigma_{i=0}^{n}\text{Hit}[i]+\text{miss}[\infty])$$

in which Hit[i] refers to the hit count for a given reuse distance, i, and Miss [∞] represents the number of misses that occur even if the maximum of n blocks is allocated. The MRC can be constructed by computing the miss-ratios for various block allocations.

As described herein, analysis and planning VM 155 utilizes one or more MRC(s) to determine an amount of cache/memory allocate for a given workload based upon a target miss rate for the workload. For example, a target miss rate at high target value 605 corresponds to small cache allocation 610. Similarly, a target miss rate at low target value 615 corresponds to large cache allocation 620.

FIG. 7 is a representation of incremental periods of time in which incremental I/O traces may be taken from one or more workloads. As described above, incremental I/O traces taken during subsequent incremental periods of time 705-730 may be used cumulatively to represent a cumulative I/O trace of a workload. In one embodiment, incremental I/O traces are created and received for each of multiple workloads during each of the incremental periods of time 705-730. For example, FIGS. 8-9 describe two workloads analyzed during the same incremental periods of time.

In another embodiment, the number of concurrent I/O traces a host computer 135 is able to generate is limited. As a result, two or more workloads may be analyzed during different incremental periods of time. Additionally, a single workload may be analyzed during non-contiguous incremental periods of time. For example, a first incremental I/O trace may include a list of storage addresses and sizes that were subject to a plurality of I/O requests from a workload during first period of time 705 and a second I/O trace may include a list of storage addresses and sizes that were subject to a plurality of I/O requests from the workload during second period of time 720. Intervening period of time 710-715 exists between first period of time 705 and second period of time 720 and I/O trace data for the workload is lacking during intervening time period 710-715.

In one embodiment, the periods of time corresponding to incremental I/O traces represent random samples during an operation of a workload. Continuing the example above, two incremental periods 710-715 fall between first incremental I/O trace period 705 and second incremental I/O trace period 720. Due to the random sampling, the number of incremental periods between I/O trace periods may vary. For example, a third incremental I/O trace may be created during time period 730, with only one incremental period 725 falling between second incremental I/O trace period 720 and third incremental I/O trace time period 730. A fourth incremental I/O trace time period may be randomly selected 0, 1, 2, 3, or more incremental time periods following third incremental I/O trace time period 730, and so on. The analysis of non-contiguous, random incremental I/O trace time periods is described further with reference to FIG. 10.

Figure 8:
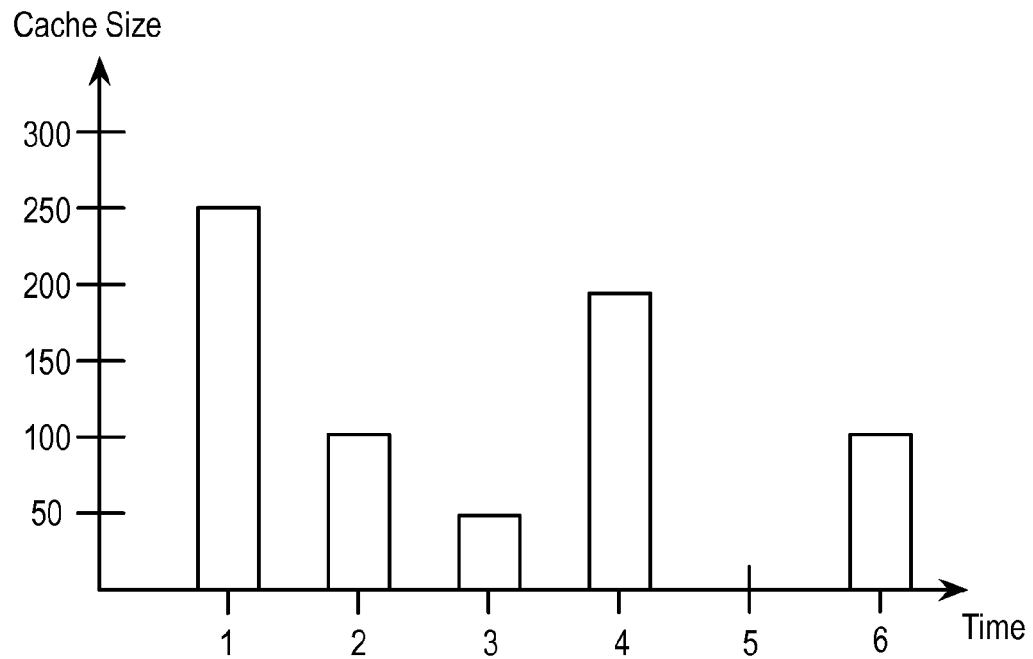
FIG. 8 is an exemplary chart of cache sizes corresponding to miss ratio curves of incremental traces of a workload.
Figure 9:
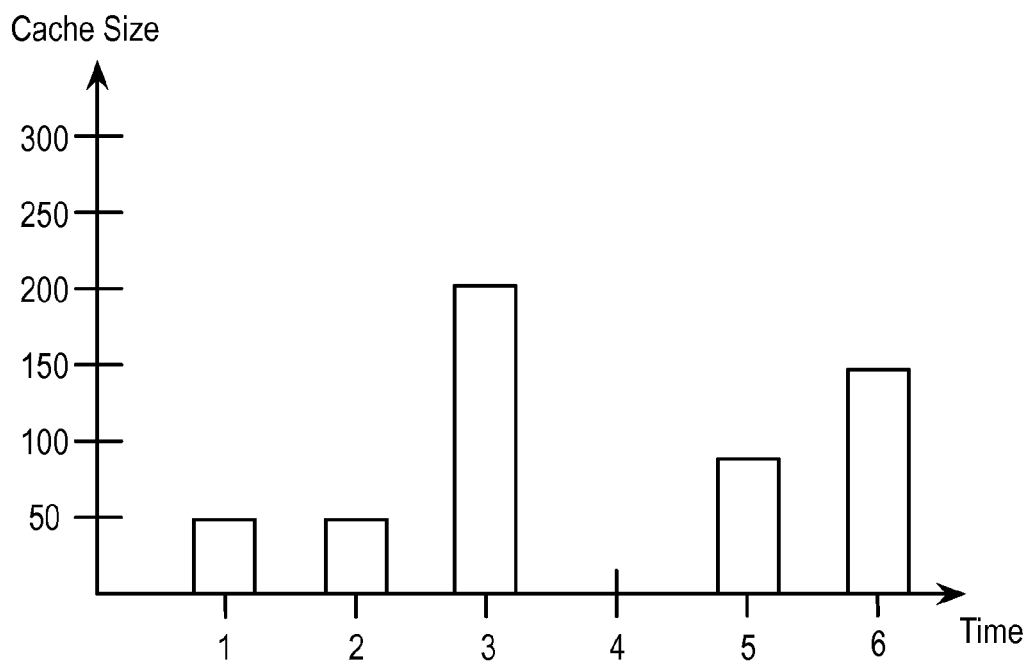
FIG. 9 is an exemplary chart of cache sizes corresponding to miss ratio curves of incremental traces of another workload.

FIG. 8 is an exemplary chart of cache sizes corresponding to miss ratio curves of incremental traces of a first workload and FIG. 9 is an exemplary chart of cache sizes corresponding to miss ratio curves of incremental traces of a second workload. As described above with reference to FIG. 4, the recommended cache size may be based upon a sum of the maximum amounts of cache that would be used by each workload during an incremental period of time or based upon a maximum of the summed cache sizes of the workloads during each single, overlapping incremental period of time. Using the sum of the maximum amounts of cache as an example, the first workload is illustrated in FIG. 8 as having a maximum cache allocation of 250 in time period 1. The second workload is illustrated as having a maximum cache allocation of 200 in time period 3. The corresponding recommended cache size for the combination of the first and second workloads would be 450.

Using the maximum of the sums of cache sizes as an example, the first and second workloads have cache sizes, respectively, of 250 and 50 in time period 1. The combination of these cache sizes results in a sum of 300 for time period 1. Similarly, the first and second workloads have cache sizes, respectively, of 100 and 50 in time period 2, 50 and 200 in time period 3, 200 and 0 in time period 4, etc. The combination of these cache sizes results in a sum of 150 for time period 2, 250 for time period 3, 200 for time period 4, etc. The maximum of the illustrated exemplary sums is the cache size 300 in time period 1.

Figure 10:
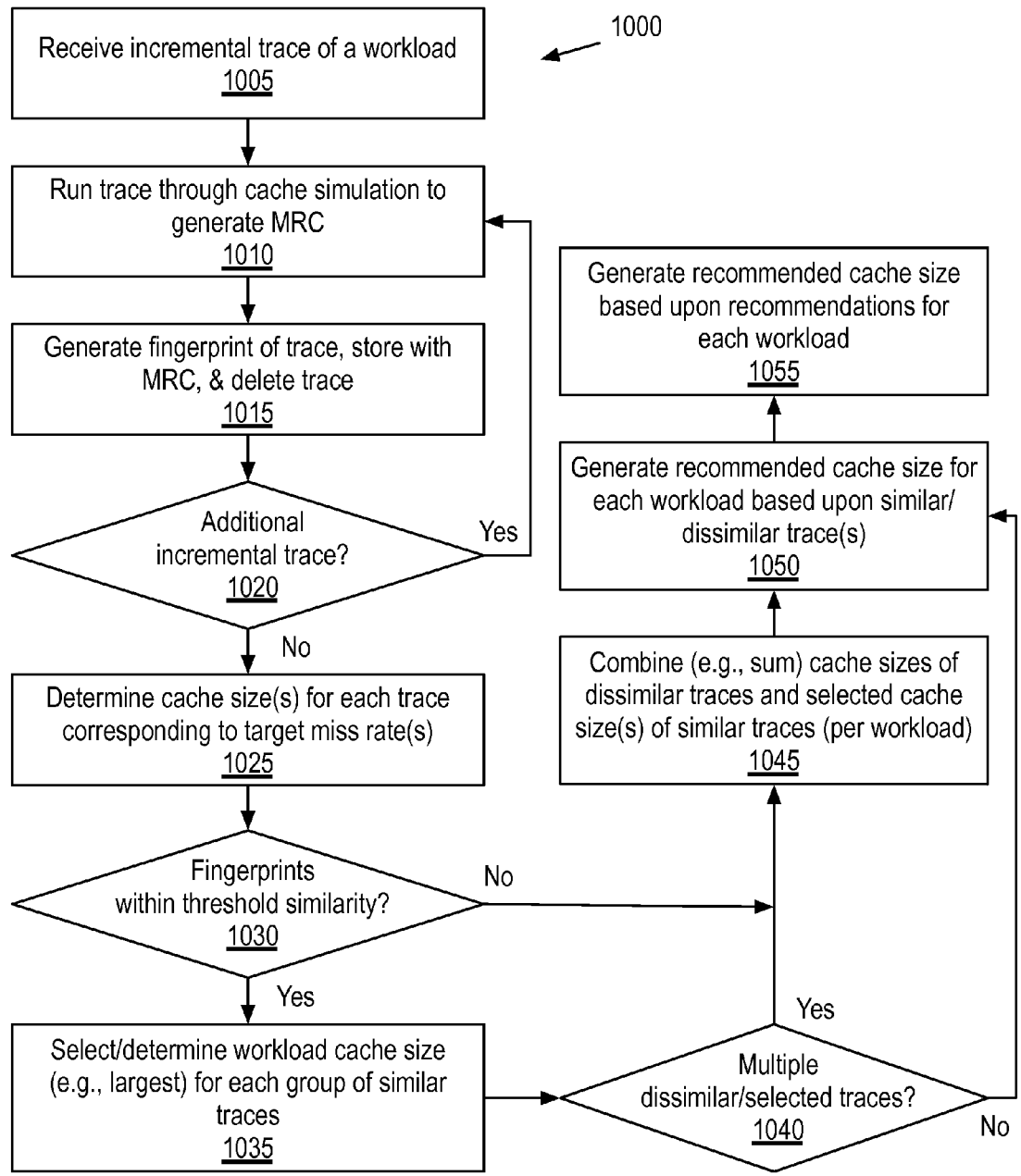
FIG. 10 is a flow chart illustrating another exemplary method of generating a recommended cache size for one or more workloads.

FIG. 10 is a flow chart illustrating exemplary method 1000 of generating a recommended cache size for one or more workloads. As discussed above, the number of concurrent I/O traces host computers 135 are able to generate may be limited. In such an embodiment, a single workload may be subjected to I/O traces during non-contiguous incremental periods of time. As a result of intervening periods of time that lack I/O trace data, generating a cumulative MRC for the workload as described above may not be as accurate. Instead of generating a cumulative MRC for the workload as described above, method 1000 utilizes incremental MRCs with consideration of phases of operation of the workload.

At block 1005, analysis and planning VM 155 receives an incremental I/O trace of a workload (e.g., as described with reference to block 405 of FIG. 4). At block 1010, analysis and planning VM 155 runs the received incremental I/O trace through a cache simulation (e.g., as described with reference to block 410 of FIG. 4) and generates an MRC (e.g., as described with reference to FIGS. 4, 5, and 6).

At block 1015, analysis and planning VM 155 generates a fingerprint of the incremental I/O trace, stores the fingerprint along with the MRC, and deletes the incremental I/O trace. For example, analysis and planning VM 155 may generate a hash of the incremental I/O trace or use another fingerprint algorithm that maps the incremental I/O trace to a shorter representation of the incremental I/O trace. In one embodiment, the fingerprint is generated using one or more of: an ordered list of logical storage addresses, data lengths of the requests, the access pattern, and/or I/O latency.

In one embodiment, the fingerprint is mapped to the MRC. For example, analysis and planning VM 155 creates or updates a data structure mapping the stored fingerprint to the stored MRC. In one embodiment, the fingerprint and/or MRC are also mapped to the corresponding workload. As a result, fingerprints of incremental I/O traces from the same workload can be compared to one another as described below.

At block 1020, analysis and planning VM 155 determines if another incremental I/O trace is to be processed. If so, method 1000 returns to block 1010. If no other incremental I/O trace is to be processed, at block 1025, analysis and planning VM 155 determines the cache size(s) for each incremental I/O trace based upon corresponding target miss rate(s) (e.g., as described with reference to FIGS. 4 and 6).

At block 1030, analysis and planning VM 155 determines if any fingerprints of the incremental I/O traces of the same workload are within a threshold level of similarity. Incremental I/O traces within a threshold level of similarity are determined to represent similar phases of operation of the workload. For example, if the fingerprint of a first incremental I/O trace from a workload differs from the fingerprint of a second incremental I/O trace from the workload by 5% or less, analysis and planning VM 155 determines that the first and second incremental I/O traces represent a similar phase of operation. Following the same example, if the fingerprint of a first incremental I/O trace from a workload differs from the fingerprint of a second incremental I/O trace from the workload by more than 5%, analysis and planning VM 155 determines that the first and second incremental I/O traces represent different phases of operation.

If two or more fingerprints are within the threshold level of similarity, at block 1035, analysis and planning VM 155 determines a cache size to represent each group of incremental I/O traces with similar fingerprints. In one embodiment, analysis and planning VM 155 selects the largest determined cache size within the group to represent the group. In an alternate embodiment, analysis and planning VM 155 determines an average, mean, median, or other combination of the determined cache sizes to represent the group.

At block 1040, analysis and planning VM 155 determines if the comparison of fingerprints yielded an incremental I/O trace that represents a different phase of operation than another incremental I/O trace from the same workload. For example, individual (non-grouped) incremental I/O traces may have dissimilar fingerprints, an individual incremental I/O trace may have a fingerprint that differs from a group of incremental I/O traces, or two groups of incremental I/O traces may have dissimilar fingerprints.

If the fingerprints of individual or groups of I/O traces are not within the threshold level of similarity, at block 1045, analysis and planning VM 155 combines the cache sizes representing the dissimilar incremental I/O traces/groups for each workload. For example, analysis and planning VM 155 may sum the determined cache sizes of dissimilar individual incremental I/O traces. Additionally, analysis and planning VM 155 may sum the determined cache sizes of one or more dissimilar individual incremental I/O traces with a determined representative cache size for a group of similar incremental I/O traces. Furthermore, analysis and planning VM 155 may sum the determined representative cache sizes of multiple, different groups of incremental I/O traces.

Upon combining the cache sizes of dissimilar incremental I/O traces/groups for each workload, or if there are no dissimilar incremental I/O traces/groups, at block 1050, analysis and planning VM 155 generates a recommend cache size for each workload. For example, the recommended cache size for a given workload may be the corresponding combined cache sizes of dissimilar and/or selected representative cache sizes or, if the incremental I/O traces are all within a single group, the selected representative cache size.

At block 1055, analysis and planning VM 155 generates an aggregate recommended cache size based upon the recommend cache sizes for each workload. For example, analysis and planning VM 155 may sum the workload cache sizes to generate the aggregate recommended cache size. As a result, an administrator is presented with a recommendation as to how much cache to allocate, e.g., for the configuration of a VSAN with the analyzed workloads.

Figure 11:
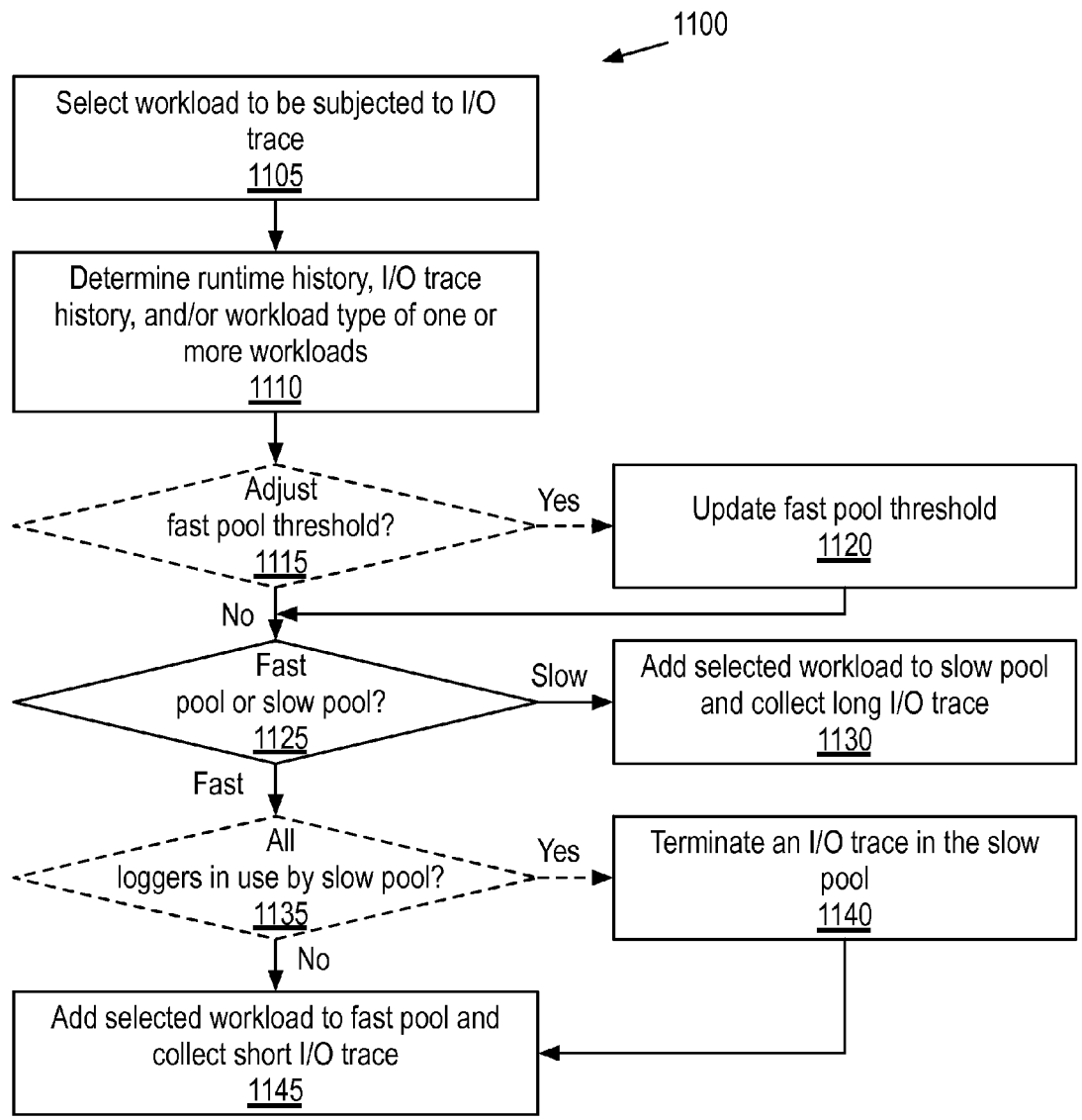
FIG. 11 is a flow chart illustrating an exemplary method of collecting input/output trace data for one or more workloads.

FIG. 11 is a flow chart illustrating exemplary method 1100 of collecting I/O trace data for one or more workloads. As discussed above, the number of concurrent I/O traces a host computer 135 is able to generate may be limited. Additionally, the window of time in which host computer 135 is able to collect I/O trace data for a given workload may be of a short and/or unpredictable length. As a result, host computers 135 utilize method 1100 to determine whether to generate a short I/O trace or a long I/O trace for each selected workload.

At block 1105, workload collector 140 selects a workload to be subjected to an I/O trace. In one embodiment, workload collector 140 utilizes random sampling with replacement to select a workload among the plurality of workloads running on host computer 135. Alternatively, workload collector 140 utilizes random sampling without replacement, round robin, or another selection algorithm to select a workload.

At block 1110, workload collector 140 determines the runtime history, I/O trace history, and/or workload type of one or more of the plurality of workloads running on host computer 135. For example, workload collector 140 may determine a history of how long the selected workload has run. This runtime history may be expressed as a collection of runtimes from start up to shut down; a minimum, maximum, average, median, or mean runtime from start up to shut down; and/or an amount of time the workload has been running since its latest start up. The runtime history may also be expressed as a zero value to represent that the workload has not previously run. The I/O trace history may be expressed as a number of I/O traces previously collected for a given workload. Exemplary workload types include virtual desktops and various virtualized compute, networking, storage, or security services (e.g., a firewall, webserver, database server, etc.).

At block 1115, workload collector 140 optionally determines whether or not to adjust a fast pool threshold. For example, workload collector 140 may divide the limited number of concurrent I/O traces a host computer 135 is able to generate into two pools: a fast pool and a slow pool. I/O traces collected in the fast pool are collected for a short length of time, e.g., one minute. I/O traces collected in the slow pool are collected for a longer length of time, e.g., five to ten minutes. In order to balance I/O traces collected in each pool, workload collector 140 may utilize a static or dynamic threshold to limit the number of loggers collecting I/O traces in the fast pool and/or a static or dynamic threshold to limit the number of loggers collecting I/O traces in the slow pool. For example, a default fast pool threshold may be set to limit workload collector 140 to a maximum of five loggers collecting I/O traces in the fast pool.

In one embodiment, as described in further detail below, workload collector 140 utilizes threshold values for runtime history and/or I/O trace history to differentiate whether each workload is a candidate for the fast pool or the slow pool. Additionally, workload collector 140 may associate particular types of workloads with the fast pool or the slow pool. For example, virtual desktops may initially default to the fast pool, while webservers default to the slow pool. In one embodiment, workload collector 140 maintains a table or other data structure mapping the plurality of workloads running on host computer 135 to runtime history, I/O trace history, workload type, and/or an I/O trace pool. Additionally, workload collector 140 may determine (e.g., based upon an indication provided by virtualization software 120 or VIM server 130) when workloads are being booted up to determine runtime history.

If workload collector 140 determines to adjust or otherwise set the fast pool threshold, at block 1120, workload collector 140 updates the fast pool threshold. For example, using the data structure described above, workload collector 140 determines a ratio of the workloads that are going to be assigned to the fast pool as compared to the workloads that are going to be assigned to the slow pool. When a large number of VMs 110 is initially booted up or otherwise associated with the fast pool, workload collector 140 may set or otherwise adjust the fast pool threshold to accommodate a larger number of loggers to collect I/O traces in the fast pool. When a large number of the VMs 110 is associated with the slow pool, workload collector 140 may set or otherwise adjust the fast pool threshold to accommodate a smaller number of loggers to collect I/O traces in the fast pool.

If workload collector 140 determines not to adjust the fast pool threshold or bypasses this optional determination, at block 1125, workload collector 140 determines whether the selected workload is to be subjected to a short I/O trace or a long I/O trace (e.g., whether the selected workload is to be added to the fast pool or the slow pool). As discussed above, workload collector 140 may utilize a table or other data structure to map the selected workload to runtime history, I/O trace history, workload type, and/or an I/O trace pool. In one embodiment, a workload that has not yet to be subjected to a threshold number of I/O traces is added to the fast pool. For example, a workload that has yet to be subjected to any I/O trace collections is added to the fast pool while a workload that has been subjected to one or more I/O trace collections is added to the slow pool. In one embodiment, a workload that has yet to run for a threshold period of time is added to the fast pool. For example, a workload that has run for less than five minutes may be added to the fast pool while a workload that has run for five or more minutes may be added to the slow pool. In one embodiment, workload collector 140 selects the fast pool or the slow pool based upon workload type. For example, a virtual desktop lacking a threshold number of I/O traces or threshold amount of runtime may be added to the fast pool while a database server is added to the slow pool. In one embodiment, workload collector 140 determines a collective runtime history for workloads of each workload type to determine whether workloads of that type should, by default, be added to the fast pool or to the slow pool.

If the workload is to be added to the slow pool, at block 1130, workload collector 140 adds the workload to the slow pool or otherwise subjects the workload to a long I/O trace. In one embodiment, workloads added to the slow pool are subjected to an I/O trace for five to ten minutes.

If the workload is to be added to the fast pool, at block 1135, workload collector 140 optionally determines if all loggers are currently in use by the slow pool. For example, if a new workload has booted up when all loggers are in use by the slow pool, workload collector 140 may be exposed to the risk of the new workload shutting down before at least one logger completes the current slow pool I/O trace, thereby causing workload collector 140 to miss the opportunity to collect an I/O trace for the new workload.

If all loggers are currently in use by the slow pool, at block 1140, workload collector 140 terminates an I/O trace in the slow pool. For example, workload collector 140 may select the I/O trace that has been running the longest and terminate it. In an alternate embodiment, workload collector 140 terminates an I/O trace in the slow pool when the longest running I/O trace has more than a threshold period of time remaining in the trace. For example, if the longest running I/O trace has more time remaining than the corresponding period of time for a fast trace, the I/O trace is terminated.

If less than all of the loggers are currently in use by the slow pool or if this determination is bypassed, at block 1145, workload collector 140 adds the selected workload to the fast pool or otherwise subjects the workload to a short I/O trace. In one embodiment, workloads added to the fast pool are subjected to an I/O trace for one minute.

Figure 12:
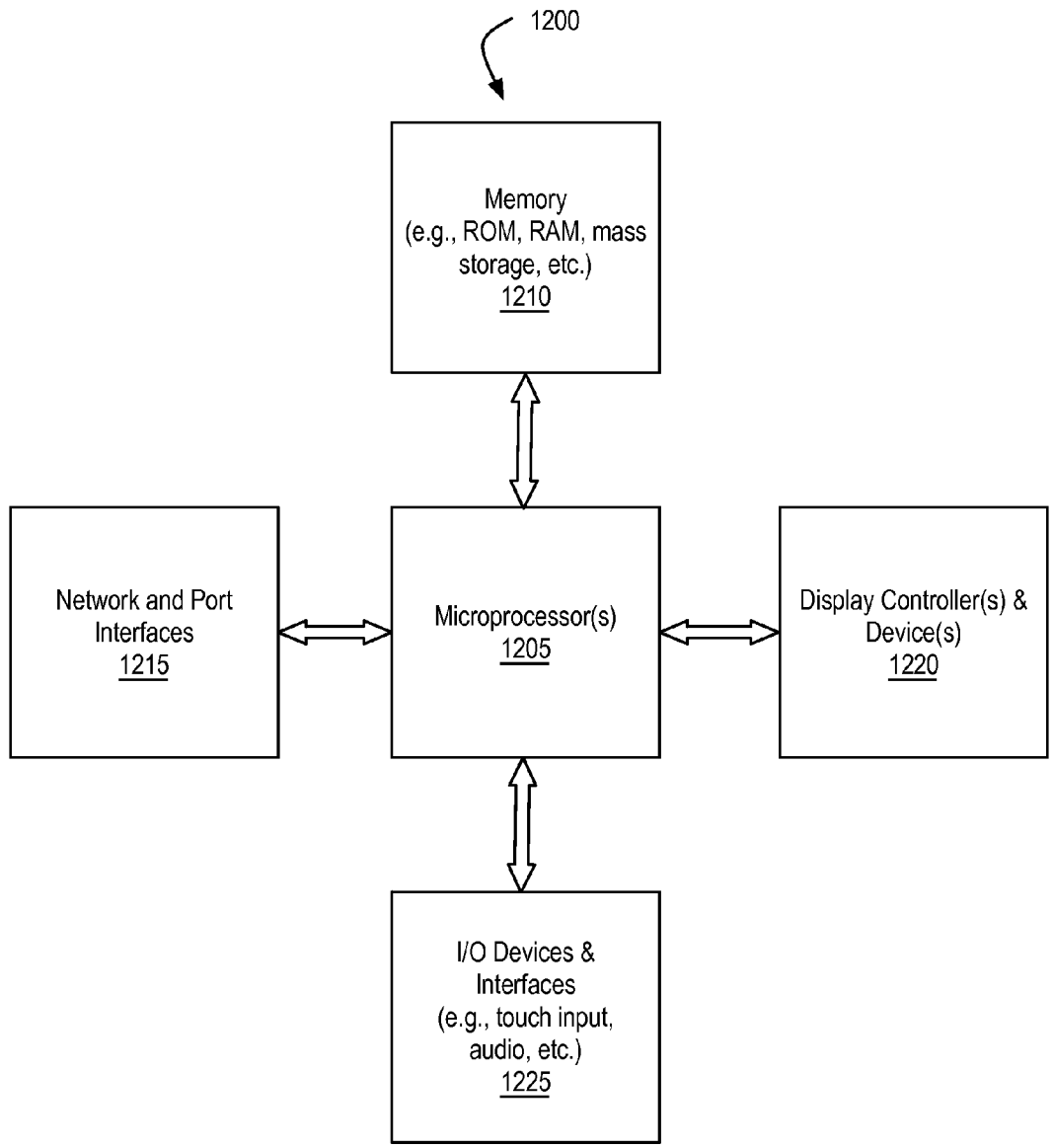
FIG. 12 illustrates, in block diagram form, an exemplary processing system to implement workload selection and cache capacity planning for a virtual storage area network.

FIG. 12 illustrates, in block diagram form, an exemplary processing system to implement workload selection and cache capacity planning for a virtual storage area network. Data processing system 1200 includes one or more microprocessors 1205 and connected system components (e.g., multiple connected chips). Alternatively, data processing system 1200 is a system on a chip.

Data processing system 1200 includes memory 1210, which is coupled to microprocessor(s) 1205. Memory 1210 may be used for storing data, metadata, and programs for execution by the microprocessor(s) 1205. Memory 1210 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1210 may be internal or distributed memory.

Data processing system 1200 includes network and port interfaces 1215, such as a port, connector for a dock, or a connector for a USB interface, FireWire, Thunderbolt, Ethernet, Fibre Channel, etc. to connect the system 1200 with another device, external component, or a network. Exemplary network and port interfaces 1215 also include wireless transceivers, such as an I7 802.11 transceiver, an infrared transceiver, a Bluetooth transceiver, a wireless cellular telephony transceiver (e.g., 2G, 3G, 4G, etc.), or another wireless protocol to connect data processing system 1200 with another device, external component, or a network and receive stored instructions, data, tokens, etc.

Data processing system 1200 also includes display controller and display device 1220 and one or more input or output ("I/O") devices and interfaces 1225. Display controller and display device 1220 provides a visual user interface for the user. I/O devices 1225 allow a user to provide input to, receive output from, and otherwise transfer data to and from the system. I/O devices 1225 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 12.

Data processing system 1200 is an exemplary representation of one or more of client device(s) 105, administrator device 106, VIM server 130, and host computer(s) 135, described above. Data processing system 1200 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1200 may be a network computer, server, or an embedded processing device within another device or consumer electronic product. As used herein, the terms computer, device, system, processing system, processing device, and "apparatus comprising a processing device" may be used interchangeably with data processing system 1200 and include the above-listed exemplary embodiments.

It will be appreciated that additional components, not shown, may also be part of data processing system 1200, and, in certain embodiments, fewer components than that shown in FIG. 12 may also be used in data processing system 1200. It will be apparent from this description that aspects of the inventions may be embodied, at least in part, in software. That is, the computer-implemented method(s) 200, 400, 1000, and 1100 may be carried out in a computer system or other data processing system 1200 in response to its processor or processing system 1205 executing sequences of instructions contained in a memory, such as memory 1210 or other non-transitory machine-readable storage medium. The software may further be transmitted or received over a network (not shown) via network interface device 1215. In various embodiments, hardwired circuitry may be used in combination with the software instructions to implement the present embodiments. Thus, the techniques are not limited to any specific combination of hardware circuitry and software, or to any particular source for the instructions executed by data processing system 1200.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to workloads implemented by computational and network environments that include virtual machines (VMs). However, VMs are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used herein, the term "exemplary" refers to embodiments that serve as simply an example or illustration. The use of exemplary should not be construed as an indication of preferred examples. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
receiving a first input/output (I/O) trace including storage addresses that were subject to a plurality of I/O requests from a first workload during a first period of time;
using the first I/O trace as an input to a cache simulation using a plurality of simulated cache sizes;
storing a first state of the cache simulation upon completing a simulation of the first I/O trace wherein the first state is a result of the cache simulation;
deleting the first I/O trace in response to storing the first state of the cache simulation;
receiving a second I/O trace including storage addresses that were subject to a plurality of I/O requests from the first workload during a second period of time;
generating a cumulative miss ratio curve (MRC) for the first workload by loading the stored first state as a starting point for simulating the second I/O trace and running the second I/O trace through the cache simulation from the starting point;
receiving a plurality of I/O traces including storage addresses that were subject to a plurality of I/O requests from a second workload;
determining an cumulative MRC for the second workload by running the plurality of I/O traces from the second workload through the cache simulation;
receiving user selection of a first target miss rate for the first workload and a second target miss rate for the second workload;
generating a recommended cache size that corresponds to the first and second target miss rates based upon the target miss rates and corresponding MRCs; and
allocating an amount of a cache of a virtual storage area network (VSAN) based on the recommended cache size.

2. The computer-implemented method of claim 1, further comprising:
receiving a third input/output (I/O) trace including storage addresses that were subject to a plurality of I/O requests from a second workload during a third period of time; and
running the third I/O trace through the cache simulation after running the first I/O trace through the cache simulation and before running the second I/O trace through the cache simulation.

3. The computer-implemented method of claim 1, wherein determining the recommended cache size comprises:
determining a cache size for the first workload that corresponds to the first target miss rate in the cumulative MRC for the first workload;
determining a cache size for the second workload that corresponds to the second target miss rate in the cumulative MRC for the second workload; and
summing the determined cache size for the first workload and the determined cache size for the second workload.

4. The computer-implemented method of claim 1, wherein running each of the first and second I/O traces through the cache simulation includes determining an incremental MRC for the first workload, wherein running the plurality of I/O traces through the cache simulation includes determining a plurality of incremental MRCs for the second workload by running each of the plurality of I/O traces through the cache simulation, and wherein determining the recommended cache size comprises:
determining which incremental MRC for the first workload has a largest cache size corresponding to the first target miss rate;
determining which incremental MRC for the second workload has a largest cache size corresponding to the second target miss rate; and
summing the largest cache size corresponding to the first target miss rate and the largest cache size corresponding to the second target miss rate.

5. The computer-implemented method of claim 1, wherein running each of the first and second I/O traces through the cache simulation includes determining an incremental MRC for the first workload, wherein running the plurality of I/O traces through the cache simulation includes determining a plurality of incremental MRCs for the second workload by running each of the plurality of I/O traces through the cache simulation, and wherein determining the recommended cache size comprises:
determining a first cache size corresponding to the first target miss rate using an incremental MRC for the first workload simulated during the first period of time;
determining a second cache size corresponding to the second target miss rate using an incremental MRC for the second workload simulated during the first period of time;
calculating a first sum of the first and second cache sizes;
determining a third cache size corresponding to the first target miss rate using an incremental MRC for the first workload simulated during the second period of time;
determining a fourth cache size corresponding to the second target miss rate using an incremental MRC for the second workload simulated during the second period of time;
calculating a second sum of the third and fourth cache sizes; and
selecting a greater of the first and second sums.

6. The computer-implemented method of claim 1, wherein the plurality of I/O requests from the first workload during the first period of time are directed to first and second virtual disks, and wherein receiving the first I/O trace comprises:
receiving a third I/O trace including I/O requests directed to the first virtual disk;
receiving a fourth I/O trace including I/O requests directed to the second virtual disk;
modifying storage addresses in the third I/O trace or in the fourth I/O trace to avoid storage address collisions between the third and fourth I/O traces; and
merging the third and fourth I/O traces, after the modification of storage addresses, to create the first I/O trace.

7. A non-transitory computer-readable medium storing instructions, which when executed by a processing device, cause the processing device to perform a method comprising:
receiving a first input/output (I/O) trace including storage addresses that were subject to a plurality of I/O requests from a first workload during a first period of time;
using the first I/O trace as an input to a cache simulation using a plurality of simulated cache sizes;
storing a first state of the cache simulation upon completing a simulation of the first I/O trace wherein the first state is a result of the cache simulation;
deleting the first I/O trace in response to storing the first state of the cache simulation;
receiving a second I/O trace including storage addresses that were subject to a plurality of I/O requests from the first workload during a second period of time;

generating an cumulative miss ratio curve (MRC) for the first workload by loading the stored first state as a starting point for simulating the second I/O trace and running the second I/O trace through the cache simulation from the starting point;

receiving a plurality of I/O traces including storage addresses that were subject to a plurality of I/O requests from a second workload;

determining an cumulative MRC for the second workload by running the plurality of I/O traces from the second workload through the cache simulation;

receiving user selection of a first target miss rate for the first workload and a second target miss rate for the second workload;

generating a recommended cache size that corresponds to the first and second target miss rates based upon the target miss rates and corresponding MRCs; and allocating an amount of a cache of a virtual storage area network (VSAN) based on the recommended cache size.

8. The non-transitory computer-readable medium of claim 7, the method further comprising:

receiving a third input/output (I/O) trace including storage addresses that were subject to a plurality of I/O requests from a second workload during a third period of time; and running the third I/O trace through the cache simulation after running the first I/O trace through the cache simulation and before running the second I/O trace through the cache simulation.

9. The non-transitory computer-readable medium of claim 7, wherein determining the recommended cache size comprises:

determining a cache size for the first workload that corresponds to the first target miss rate in the cumulative MRC for the first workload;

determining a cache size for the second workload that corresponds to the second target miss rate in the cumulative MRC for the second workload; and summing the determined cache size for the first workload and the determined cache size for the second workload.

10. The non-transitory computer-readable medium of claim 7, wherein running each of the first and second I/O traces through the cache simulation includes determining an incremental MRC for the first workload, wherein running the plurality of I/O traces through the cache simulation includes determining a plurality of incremental MRCs for the second workload by running each of the plurality of I/O traces through the cache simulation, and wherein determining the recommended cache size comprises:

determining which incremental MRC for the first workload has a largest cache size corresponding to the first target miss rate;

determining which incremental MRC for the second workload has a largest cache size corresponding to the second target miss rate; and summing the largest cache size corresponding to the first target miss rate and the largest cache size corresponding to the second target miss rate.

11. The non-transitory computer-readable medium of claim 7, wherein running each of the first and second I/O traces through the cache simulation includes determining an incremental MRC for the first workload, wherein running the plurality of I/O traces through the cache simulation includes determining a plurality of incremental MRCs for the second workload by running each of the plurality of I/O traces through the cache simulation, and wherein determining the recommended cache size comprises:

determining a first cache size corresponding to the first target miss rate using an incremental MRC for the first workload simulated during the first period of time;

determining a second cache size corresponding to the second target miss rate using an incremental MRC for the second workload simulated during the first period of time;

calculating a first sum of the first and second cache sizes;

determining a third cache size corresponding to the first target miss rate using an incremental MRC for the first workload simulated during the second period of time;

determining a fourth cache size corresponding to the second target miss rate using an incremental MRC for the second workload simulated during the second period of time;

calculating a second sum of the third and fourth cache sizes; and selecting a greater of the first and second sums.

12. The non-transitory computer-readable medium of claim 7, wherein the plurality of I/O requests from the first workload during the first period of time are directed to first and second virtual disks, and wherein receiving the first I/O trace comprises:

receiving a third I/O trace including I/O requests directed to the first virtual disk;

receiving a fourth I/O trace including I/O requests directed to the second virtual disk;

modifying storage addresses in the third I/O trace or in the fourth I/O trace to avoid storage address collisions between the third and fourth I/O traces; and merging the third and fourth I/O traces, after the modification of storage addresses, to create the first I/O trace.

13. An apparatus comprising:
a processor; and
a hardware memory coupled to the processor, the hardware memory storing instructions which, when executed by the processor, cause the apparatus to:

receive a first input/output (I/O) trace including storage addresses that were subject to a plurality of I/O requests from a first workload during a first period of time;

use the first I/O trace as an input to a cache simulation using a plurality of simulated cache sizes;

store a first state of the cache simulation upon completing a simulation of the first I/O trace wherein the first state is a result of the cache simulation;

delete the first I/O trace in response to storing the first state of the cache simulation;

receive a second I/O trace including storage addresses that were subject to a plurality of I/O requests from the first workload during a second period of time;

generate an cumulative miss ratio curve (MRC) for the first workload by loading the stored first state as a starting point for simulating the second I/O trace and running the second I/O trace through the cache simulation from the starting point;

receive a plurality of I/O traces including storage addresses that were subject to a plurality of I/O requests from a second workload;

determine an cumulative MRC for the second workload by running the plurality of I/O traces from the second workload through the cache simulation;

receive user selection of a first target miss rate for the first workload and a second target miss rate for the second workload;

generate a recommended cache size that corresponds to the first and second target miss rates based upon the target miss rates and corresponding MRCs; and allocate an amount of a cache of a virtual storage area network (VSAN) based on the recommended cache size.

14. The apparatus of claim 13, wherein the instructions further cause the apparatus to:

receive a third input/output (I/O) trace including storage addresses that were subject to a plurality of I/O requests from a second workload during a third period of time; and run the third I/O trace through the cache simulation after running the first I/O trace through the cache simulation and before running the second I/O trace through the cache simulation.

15. The apparatus of claim 13, wherein determining the recommended cache size comprises:

determining a cache size for the first workload that corresponds to the first target miss rate in the cumulative MRC for the first workload;

determining a cache size for the second workload that corresponds to the second target miss rate in the cumulative MRC for the second workload; and summing the determined cache size for the first workload and the determined cache size for the second workload.

16. The apparatus of claim 13, wherein running each of the first and second I/O traces through the cache simulation includes determining an incremental MRC for the first workload, wherein running the plurality of I/O traces through the cache simulation includes determining a plurality of incremental MRCs for the second workload by running each of the plurality of I/O traces through the cache simulation, and wherein determining the recommended cache size comprises:

determining which incremental MRC for the first workload has a largest cache size corresponding to the first target miss rate;

determining which incremental MRC for the second workload has a largest cache size corresponding to the second target miss rate; and summing the largest cache size corresponding to the first target miss rate and the largest cache size corresponding to the second target miss rate.

17. The apparatus of claim 13, wherein running each of the first and second I/O traces through the cache simulation includes determining an incremental MRC for the first workload, wherein running the plurality of I/O traces through the cache simulation includes determining a plurality of incremental MRCs for the second workload by running each of the plurality of I/O traces through the cache simulation, and wherein determining the recommended cache size comprises:

determining a first cache size corresponding to the first target miss rate using an incremental MRC for the first workload simulated during the first period of time;

determining a second cache size corresponding to the second target miss rate using an incremental MRC for the second workload simulated during the first period of time;

calculating a first sum of the first and second cache sizes;

determining a third cache size corresponding to the first target miss rate using an incremental MRC for the first workload simulated during the second period of time;

determining a fourth cache size corresponding to the second target miss rate using an incremental MRC for the second workload simulated during the second period of time;

calculating a second sum of the third and fourth cache sizes; and selecting a greater of the first and second sums.

* * * * *